(12) United States Patent
Laget et al.

(10) Patent No.: US 11,408,473 B2
(45) Date of Patent: Aug. 9, 2022

(54) BAR SPACER FOR A BRAKED AIRCRAFT WHEEL

(71) Applicant: SAFRAN LANDING SYSTEMS, Velizy Villacoublay (FR)

(72) Inventors: Valérie Laget, Molsheim (FR); Stefano Argentero, Molsheim (FR); Rémy Dendievel, Saint Martin D'Heres (FR); Théophile Camus, Renage (FR)

(73) Assignee: SAFRAN LANDING SYSTEMS, Velizy Villacoublay (FR)

( * ) Notice: Subject to any disclaimer, the term of this patent is extended or adjusted under 35 U.S.C. 154(b) by 345 days.

(21) Appl. No.: 16/165,105

(22) Filed: Oct. 19, 2018

(65) Prior Publication Data

US 2019/0120304 A1    Apr. 25, 2019

(30) Foreign Application Priority Data

Oct. 23, 2017 (FR) ...................................... 17 60000

(51) Int. Cl.
*F16D 65/00* (2006.01)
*B64C 25/42* (2006.01)
(Continued)

(52) U.S. Cl.
CPC ........ *F16D 65/0056* (2013.01); *B29C 64/153* (2017.08); *B60T 1/062* (2013.01);
(Continued)

(58) Field of Classification Search
CPC ......... B64C 25/36; B64C 25/42; B60T 1/062;
F16D 55/36; F16D 65/02; F16D 65/0056;
F16D 2065/136; F16D 2065/1364; F16D 2065/1368; F16D 2065/138; F16D 2065/1384
(Continued)

(56) References Cited

U.S. PATENT DOCUMENTS 4,526,616 A * 7/1985 Fennell ................... F16D 65/84
                                                                                                                        419/19
5,024,297 A * 6/1991 Russell ................... F16D 55/36
                                                                                                                       188/18 A
(Continued)

FOREIGN PATENT DOCUMENTS

CN         205553074 U     9/2016
EP           0318687 A2 * 6/1989 ............. C22C 37/00
(Continued)

OTHER PUBLICATIONS

French Search Report for 1760000 dated Mar. 27, 2018.

*Primary Examiner* — Jason R Bellinger
*Assistant Examiner* — Emily G. Castonguay
(74) *Attorney, Agent, or Firm* — Sughrue Mion, PLLC (57) ABSTRACT

The invention relates to a bar spacer (10) for a braked aircraft wheel, the bar being for fitting to a rim (1) of the wheel in order to drive the rotor disks of the brake in rotation, the spacer being for interposing between the bar and the rim, the spacer comprising two bearing blocks (11) connected together by a core (15) that is pierced to pass a screw for fastening the bar to the rim. According to the invention, the bearing blocks (11) of the spacer include voids defining a void fraction of at least 30% of the volume of the bearing blocks.

7 Claims, 12 Drawing Sheets

(51) Int. Cl.
*F16D 55/36* (2006.01)
*B60T 1/06* (2006.01)
*F16D 65/095* (2006.01)
*F16B 43/02* (2006.01)
*B29C 64/153* (2017.01)
*F16B 43/00* (2006.01)
*F16D 65/092* (2006.01)
*F16D 65/02* (2006.01)
*F16D 55/00* (2006.01)

(52) U.S. Cl.
CPC ............ *B64C 25/42* (2013.01); *F16B 43/001* (2013.01); *F16B 43/02* (2013.01); *F16D 55/36* (2013.01); *F16D 65/02* (2013.01); *F16D 65/092* (2013.01); *F16D 65/095* (2013.01); *F16D 2055/0008* (2013.01); *F16D 2065/138* (2013.01); *F16D 2065/1364* (2013.01); *F16D 2065/1372* (2013.01); *F16D 2065/1392* (2013.01)

(58) Field of Classification Search
USPC .................................. 301/6.1, 6.2; 188/71.5
See application file for complete search history.

(56) References Cited

U.S. PATENT DOCUMENTS

| | | | |
|---|---|---|---|
| 5,706,915 A * | 1/1998 | Shimazu | F16D 55/22 188/218 XL |
| 5,851,056 A | 12/1998 | Hyde | |
| 6,003,954 A * | 12/1999 | Everhard | F16D 55/36 188/71.5 |
| 7,093,697 B2 * | 8/2006 | Thorp | F16D 55/36 188/71.6 |
| 2007/0246995 A1 | 10/2007 | Scelsi et al. | |
| 2011/0030378 A1 | 2/2011 | Carlisle et al. | |
| 2017/0363162 A1 * | 12/2017 | Whittle | F16D 65/128 |

FOREIGN PATENT DOCUMENTS

| | | |
|---|---|---|
| EP | 2 743 585 A1 | 6/2014 |
| EP | 2 940 340 A1 | 11/2015 |
| EP | 2 963 346 A1 | 1/2016 |
| WO | 2016/128322 A1 | 8/2016 |

* cited by examiner

BAR SPACER FOR A BRAKED AIRCRAFT WHEEL

The present invention relates to a bar spacer for a braked aircraft wheel, and to a wheel fitted therewith.

BACKGROUND OF THE INVENTION

Aircraft wheels mounted on aircraft landing gear and designed to co-operate with a brake, are known. In general, the brake comprises disks that extend inside the rim of the wheel, comprising stator disks that are prevented from rotating and that are arranged in alternation with rotor disks that are driven in rotation by the wheel rim by means of bars that are secured to the rim and that extend in peripheral notches in the rotor disks. Controlled pressure applied to the set of disks generates friction between the facing disks and thus generates a braking torque that slows rotation of the wheel.

The bars extend inside the wheel rim in a direction that is substantially parallel to the axis of rotation of the wheel. They may be made integrally with the wheel rim or they may be fitted thereto, in various ways. Certain known bars have a cylindrical tail at one end that is pushed along an axis parallel to the axis of rotation of the wheel so as to engage in a respective orifice formed in the disk of the rim, whereas the other end includes an orifice adapted to receive a screw that extends in service along a radial axis and that is screwed into a tapped orifice in the rim. The bar is then associated with a spacer that is interposed between the bar and the rim, firstly in order to position the bar in a direction parallel to the axis of rotation of the wheel, and secondly in order to contribute to limiting the flow of heat between the stack of disks and the wheel rim.

Specifically, it is important to ensure that the temperature of the rim does not exceed temperatures that could be harmful to the tires carried by the rim, given that the bars are in contact with the rotor disks, which can be raised to very high temperature during certain braking operations. The rim, which is usually made of aluminum alloy, is conventionally protected by heat shields that limit heating of the rim by radiation. However the spacer, which is in direct contact with the rim, constitutes a conduction path that can lead to local heating of the rim that is particularly awkward in that it lies in the proximity of the flange of the rim against which the tire bears.

Spacers are known that comprise two bearing blocks that are spaced apart by a central core, which is pierced to pass the screw for fastening the bar to the rim. Such a configuration optimizes the transfer of braking torque, by distributing the spacer bearing pressure over the rim. Nevertheless, where the bearing blocks make contact with the rim, that can lead to spots of heating that need to be limited.

OBJECT OF THE INVENTION

The invention seeks to propose a wheel bar spacer that reduces the transfer of heat from a disk bar to the rim.

SUMMARY OF THE INVENTION

In order to achieve this object, there is provided a bar spacer for a braked aircraft wheel, the bar being for fitting to a rim of the wheel in order to drive the rotor disks of the brake in rotation, the spacer being for interposing between the bar and the rim, the spacer comprising two bearing blocks connected together by a core that is pierced to pass a screw for fastening the bar to the rim. According to the invention, the bearing blocks of the spacer include voids defining a void fraction of at least 30% of the volume of the bearing blocks.

The voids reduce considerably the ability of the blocks to conduct heat coming from the bar and going towards the rim, without degrading the transfer of torque to the rim. These voids can easily be made by additive manufacturing techniques in a variety of shapes.

DESCRIPTION OF THE FIGURES

The invention can be better understood in the light of the following description of a particular embodiment of the invention given reference to the figures of the accompanying drawings, in which.

In the figures, the axes X, Y, Z are relative to the spacer and, when the spacer is in position on the rim, the axis X is parallel to the axis of rotation Δ of the wheel, the axis Y is parallel to a circumferential direction, and the axis Z is parallel to a radial direction. The above-mentioned directions are given by the (a, b, c) coordinates of a direction vector in the (X, Y, Z) reference frame.

DETAILED DESCRIPTION OF THE INVENTION

With reference to FIGS. 1A to 2B, a braked aircraft wheel comprises a rim 1 arranged to rotate about an axis of rotation Δ on a landing gear axle 6 via rolling bearings 7. The rim 1 receives a tire (not shown) and defines a cavity in which there extends a stack 2 of brake disks. The stack 2 comprises stator disks 2A that are prevented from rotating and rotor disks 2B that are driven in rotation by the wheel by means of bars 3 that are fastened to the rim 1 and that co-operate with clips 4 on the rotor disks 2B that serve to protect the flanks of notches in the rotor disks 2B through which the bars 3 extend. In this example, each bar 3 comprises an elongate body 3A that extends substantially along a direction parallel to the axis Δ and that has one end in the form of a cylindrical tail 3B that is received in a respective orifice 8 in the rim extending parallel to the axis X, and another end 3C that includes a hole 3D on a radial direction for receiving a fastener screw 9 for fastening the bar 3 to the rim 1.

The spacer 10 is interposed between the bar 3 and the rim 1 to act simultaneously to hold the bar in position substantially parallel to the axis of rotation Δ, to form a mechanical interface between the bar 3 and the rim 1, and to form a thermal barrier against heat being conducted from the bar 3 to the rim 1. This is all well known and is repeated merely by way of illustration.

Figure 1A:
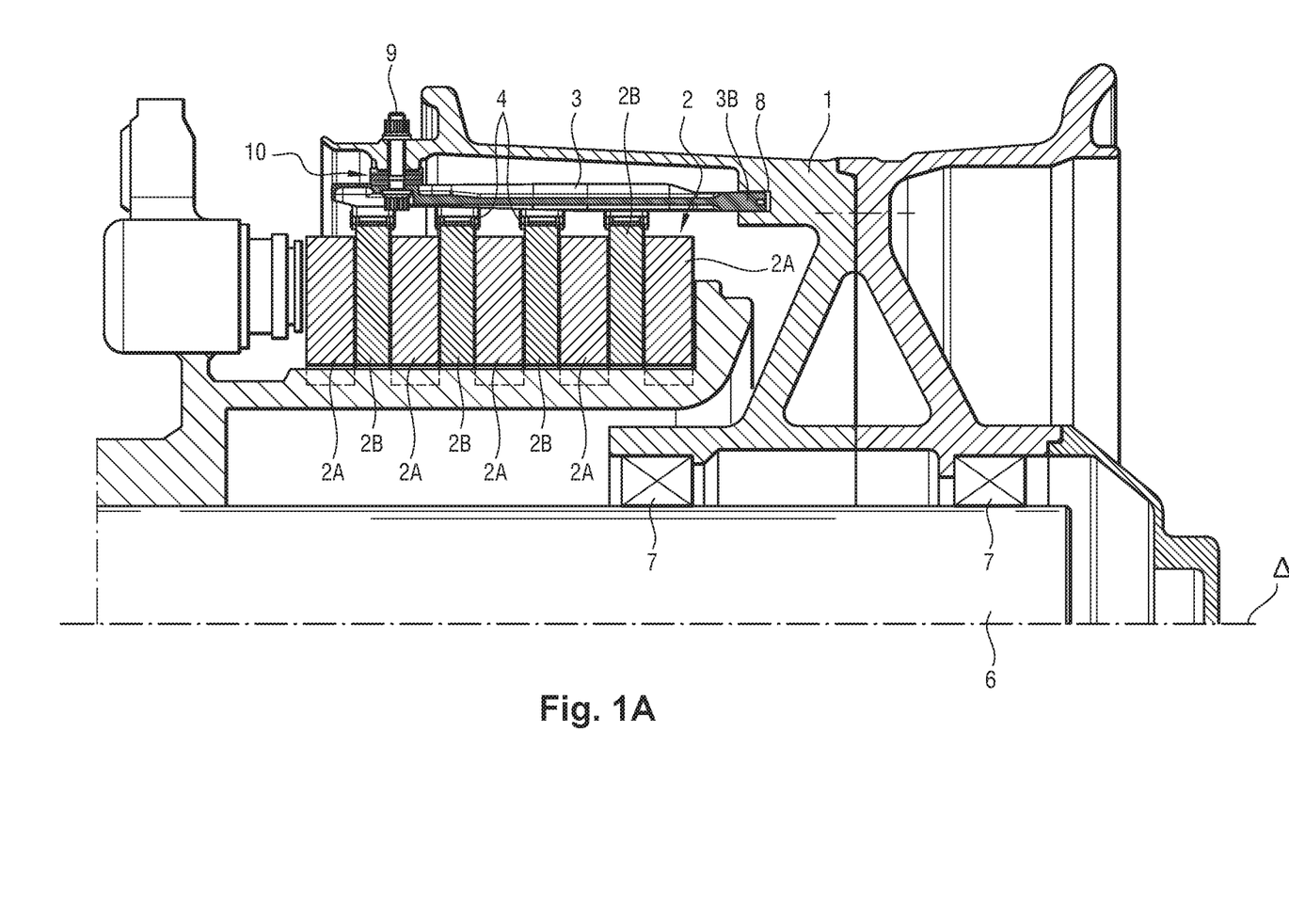
FIG. 1A is a longitudinal section view of a braked wheel mounted on an aircraft landing gear axle, in which the rim is fitted with bars with interposed spacers of the invention.
Figure 1B:
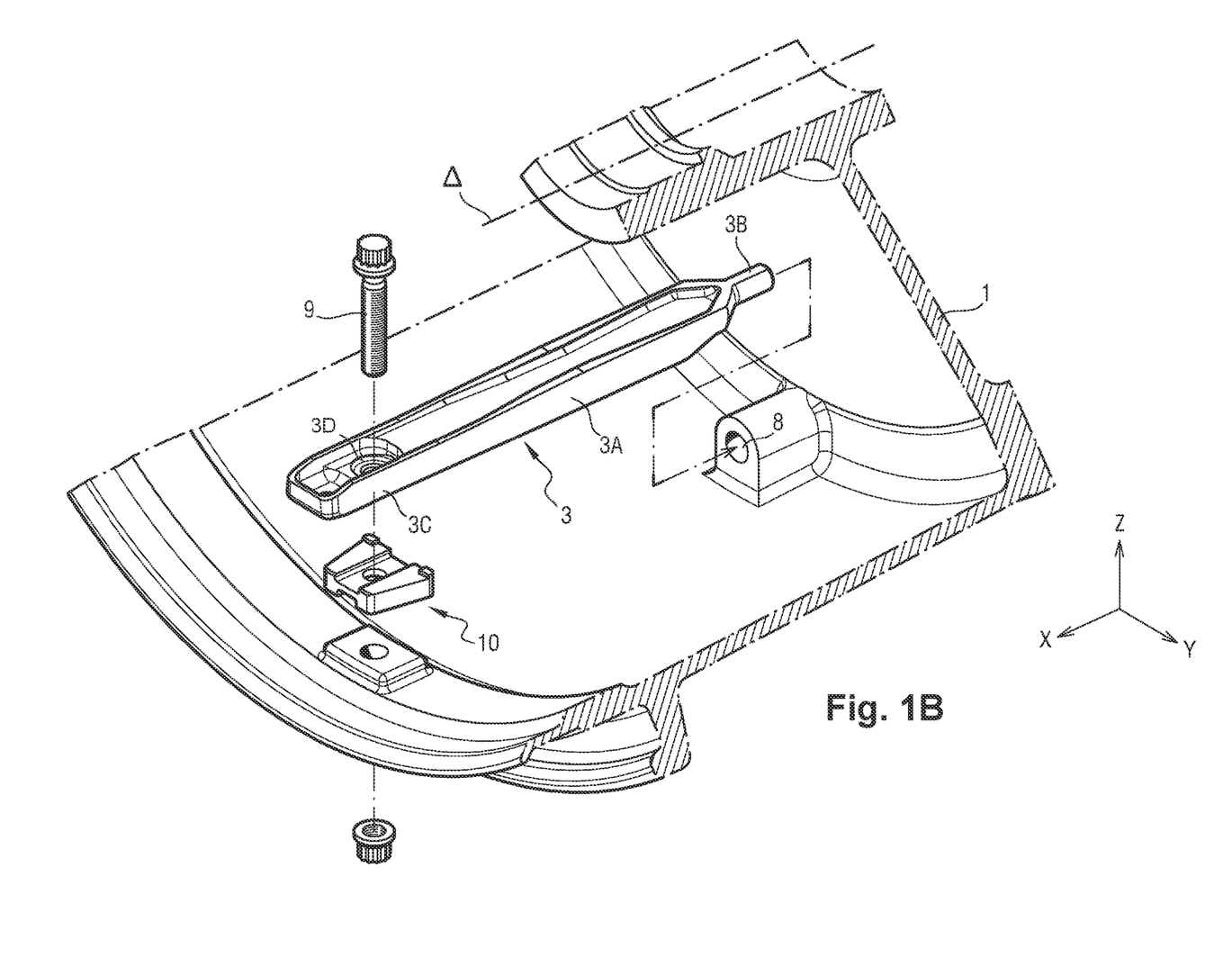
FIG. 1B is a perspective view of one of the bars and its spacer, showing how it is arranged on the wheel rim.
Figure 2A:
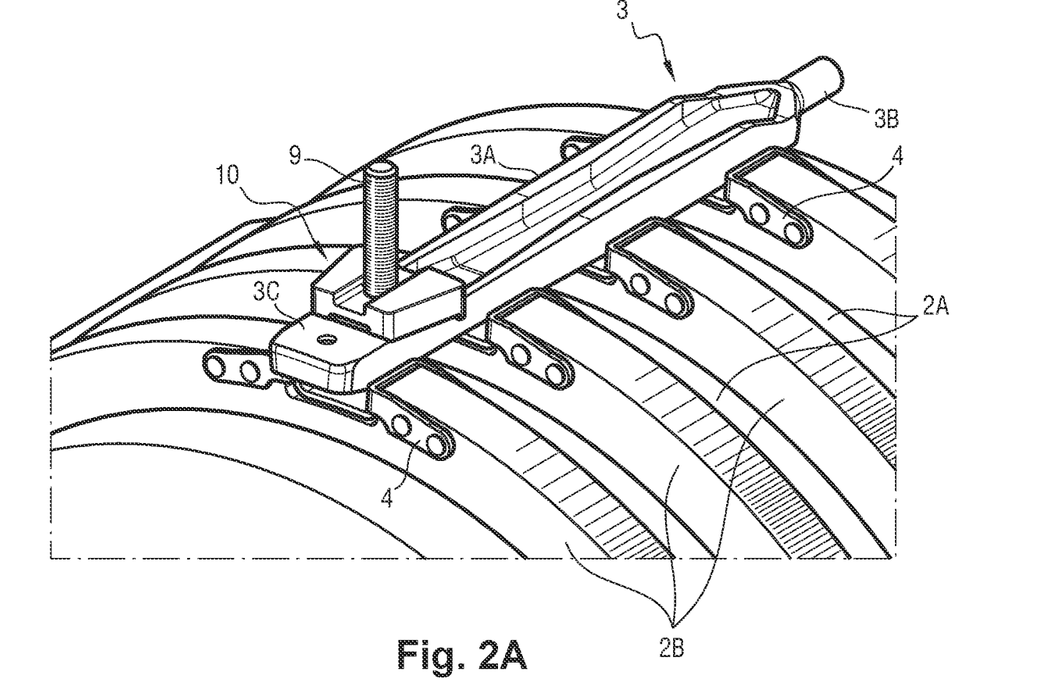
FIGS. 2A and 2B are perspective views showing the spacer and the bar of FIGS. 1A and 1B, as assembled together when in service.
Figure 2B:
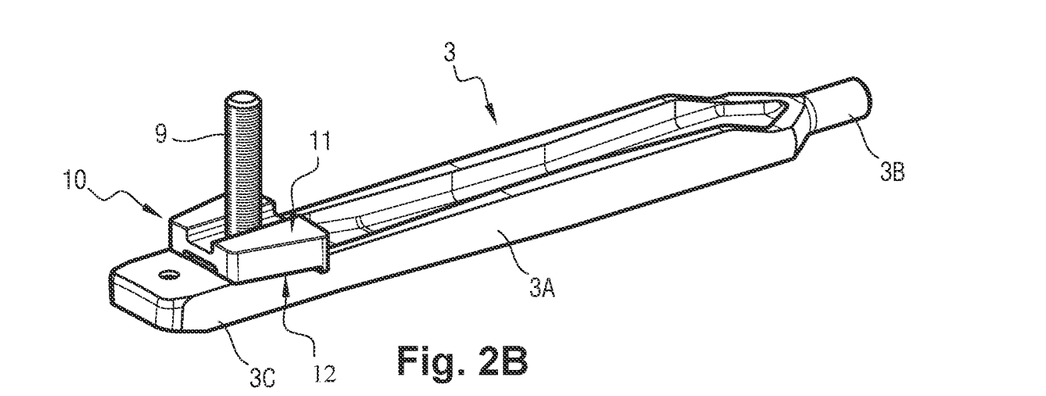

In this example, the spacer 10 comprises two bearing blocks 11 defining two opposite bearing faces, namely a bearing face 13 that bears against the rim 1, and a bearing face 12 that bears against the bar 3. Two studs 14 project from the bearing face 12 that bears against the bar 3 near to the rear face of the spacer 10 for the purpose of centering the spacer 10 on the bar 3. In this example, the bearing blocks 11 are connected together by a core 15 that includes a hole 16 for passing the screw 9 for fastening the bar 3 to the rim 1. In all of the embodiments shown herein, the bearing blocks 11 have flanks 19 that are oblique such that the front face 17 of the spacer 10 is smaller than its rear face 18.

In the invention, the bearing blocks 11 are hollowed out so as to present a void fraction equal to at least 30% of their overall volume. The term "overall volume" here means the volume defined by the external dimensions of the bearing blocks 11, which is identical before and after hollowing out. The voids formed in this way serve to reduce considerably the thermal conductivity of the spacer 10 and thus contributes to significantly limiting the heating of the rim 1 where the spacer 10 bears against the rim 1. In all of the embodiments described in detail below, the voids open out at least to the front face 17 and to the rear face 18 of the spacer 10 so as to form a passage for air through the spacers from one face to the other along the (1,0,0) direction.

Figure 3A:
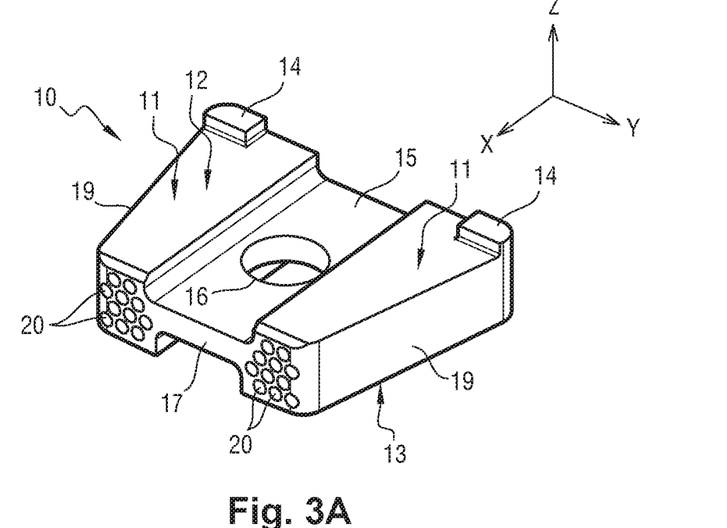
FIGS. 3A to 3C are perspective, front, and rear views showing a spacer having hollowed-out blocks in a first particular embodiment of the invention.
Figure 3B:
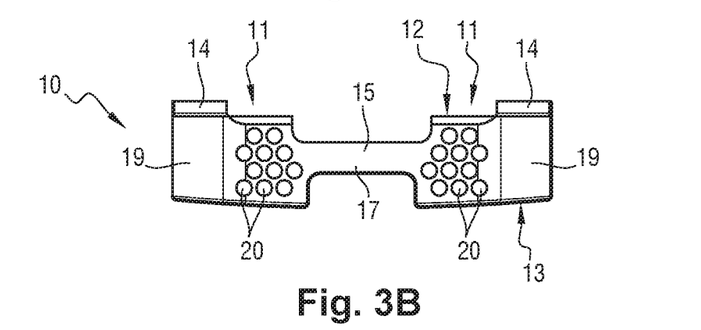
Figure 3C:
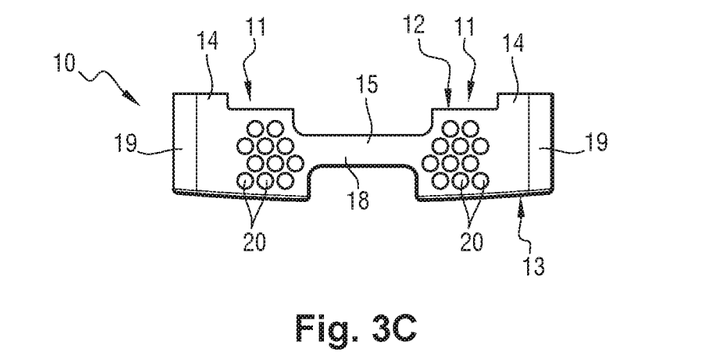

In a first particular embodiment, as shown in FIGS. 3A to 3C, the bearing blocks 11 of the spacer 10 are hollowed out by forming tubular channels 20 that extend in the (1,0,0) direction from the rear face to the front face. In this example, eleven channels 20 have been formed in each of the bearing blocks 11, thereby obtaining a void fraction of 33%. Compared with a solid spacer, the reduction in the heat flux conveyed by conduction through the spacer is estimated at 33%.

Figure 4A:
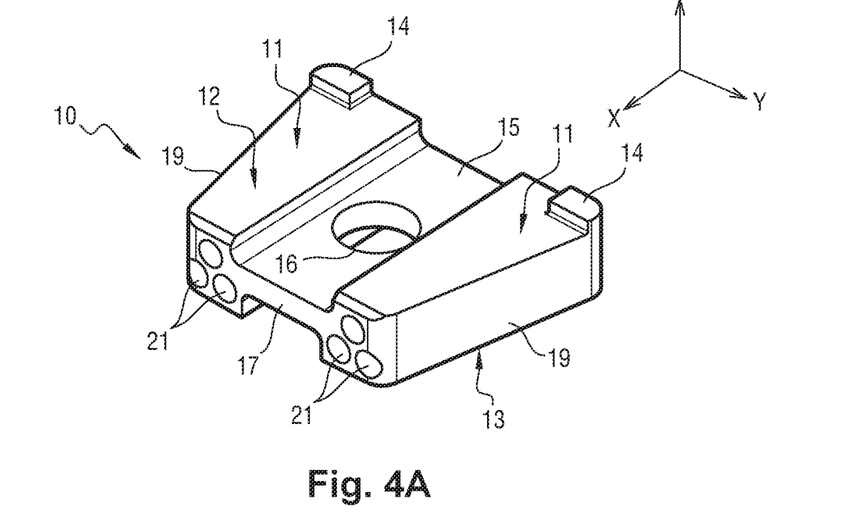
FIGS. 4A to 4C are perspective, front, and rear views showing a spacer having hollowed-out blocks in a second particular embodiment of the invention.
Figure 4B:
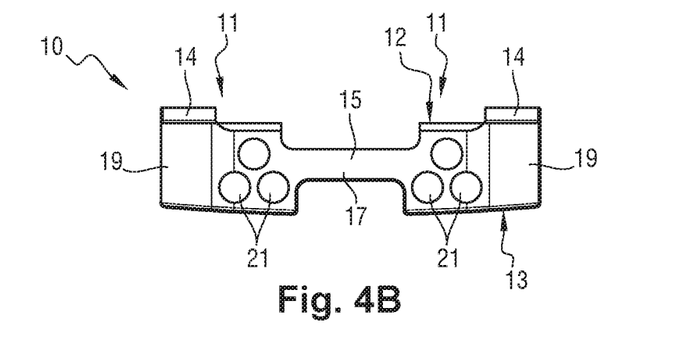
Figure 4C:
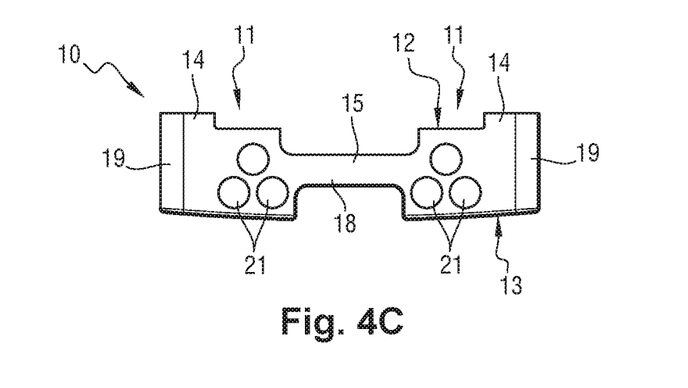

In a second particular embodiment, as shown in FIGS. 4A to 4C, the bearing blocks 11 have been hollowed out by making channels 21 that extend in the (1,0,0) direction. In this example, three channels of a diameter greater than the diameter of the channels 20 in the above embodiment are formed in each of the bearing blocks 11 so as to obtain a void fraction of 35%. Compared with a solid spacer, the reduction in the heat flux transmitted by conduction through the spacer is estimated at 35%.

The channels 20, 21 may be obtained by drilling the bearing blocks 11 after the spacer 10 has been made. Alternatively, they may be obtained at the same time as the remainder of the spacer 10 by any additive manufacturing process.

Figure 5A:
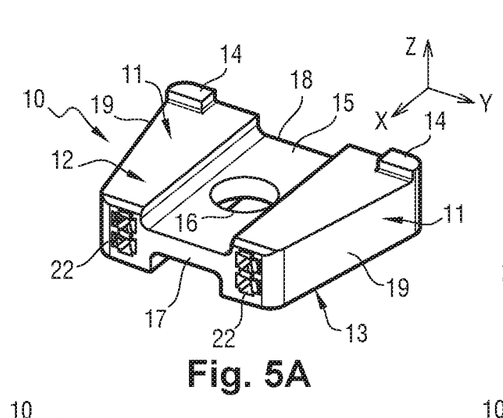
FIGS. 5A to 5F are perspective, front, and rear views followed by section views that show a spacer having hollowed-out blocks in a third particular embodiment of the invention.
Figure 5B:
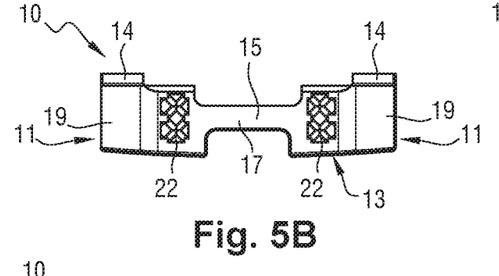
Figure 5C:
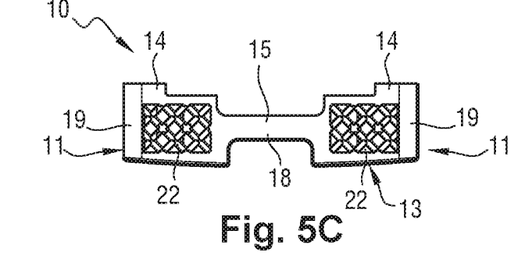
Figures 5D, 5E, 5F, 5G:
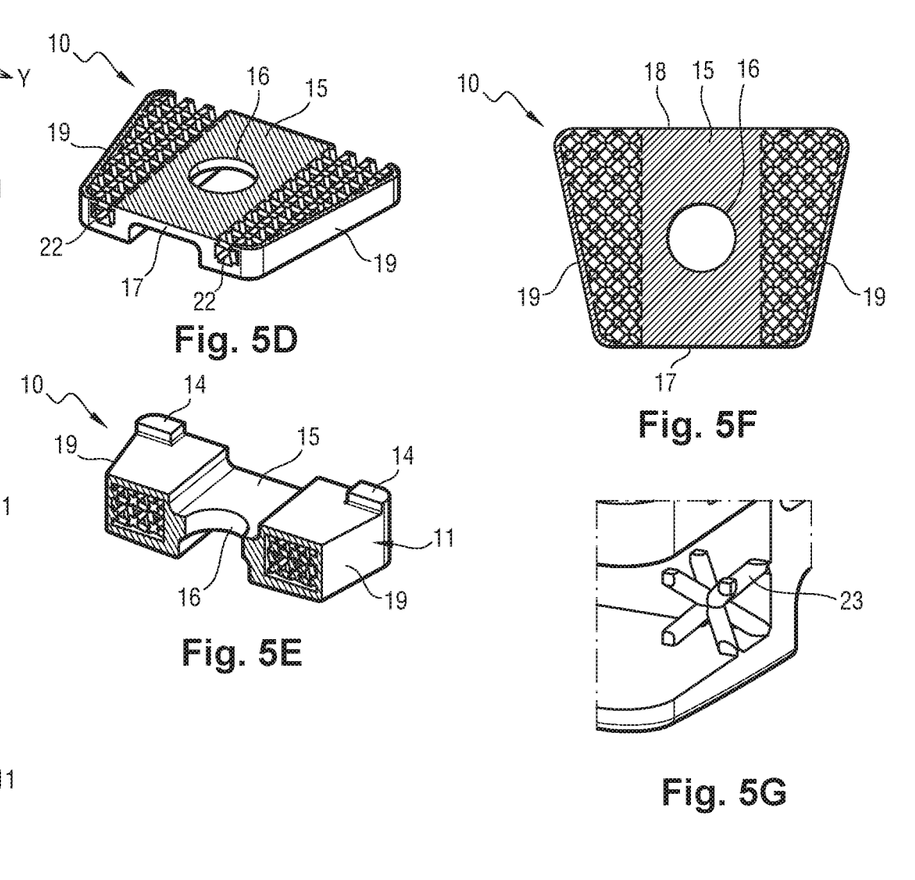
FIG. 5G is an enlargement of one of the internal patterns of the spacer.

In a third particular embodiment, as shown in FIGS. 5A to 5G, the spacer 10 is obtained by additive manufacturing so as to provide a hollowed-out trellis structure 22 inside the bearing blocks 11, which structure has a star-shaped elementary pattern 23 that can be seen in FIG. 5G. In this example, the pattern 23 is inscribed in a cube and it has branches of constant section radiating from the center of the cube towards the eight corners of the cube, and thus in the directions (1,1,1), (1,-1,-1), (-1,-1,1), and (-1,1,-1). In this example, the elementary pattern 23 is duplicated nine times along the (1,0,0) direction. The patterns as duplicated in this way are juxtaposed against one another in two layers parallel to the XY plane. One of the layers can be seen in FIGS. 5D and 5F in which the spacer is shown in section on a midplane parallel to the XY plane. In this example, the hollowed-out structure leads to a void fraction in the bearing blocks 11 of 47%. Compared with a solid spacer, the reduction in the heat flux transmitted by conduction through the spacer is estimated at 60%.

Figure 6A:
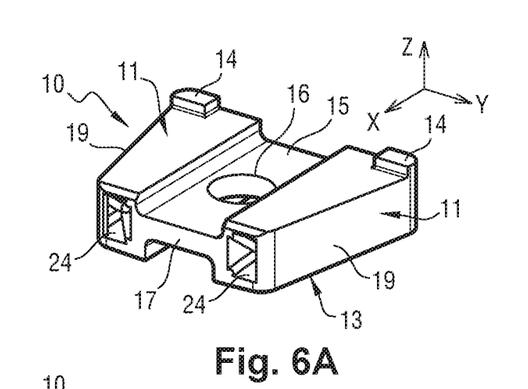
FIGS. 6A to 6F are perspective, front, and rear views followed by section views that show a spacer having hollowed-out blocks in a fourth particular embodiment of the invention.
Figure 6B:
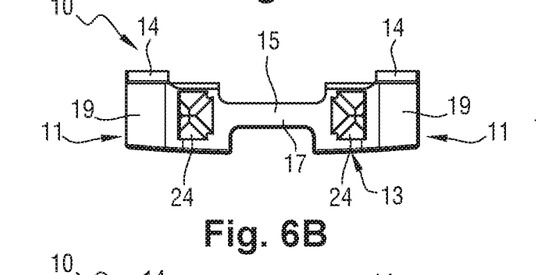
Figure 6C:
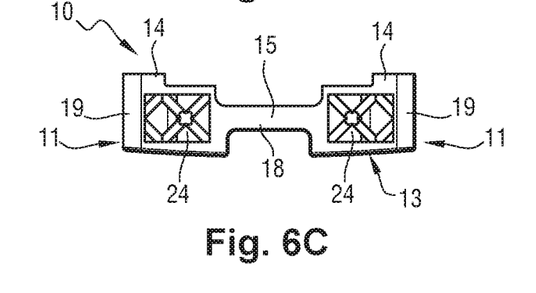
Figure 6D:
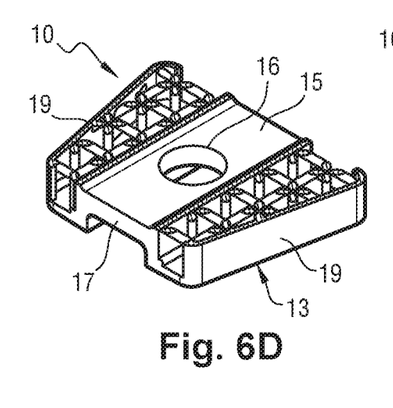
Figure 6E:
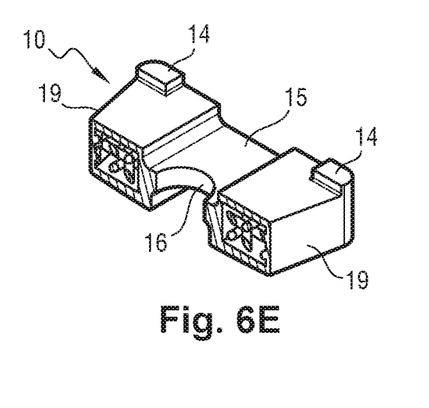
Figure 6F:
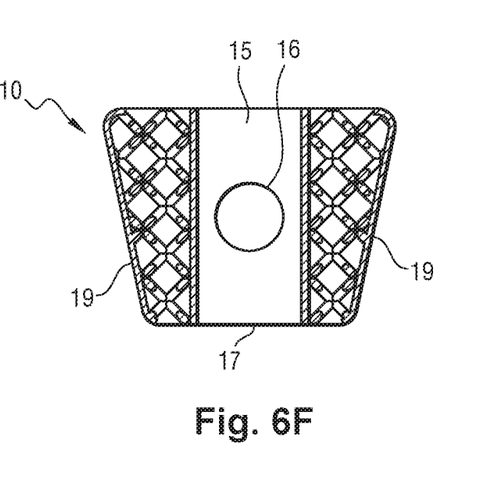
Figure 6G:
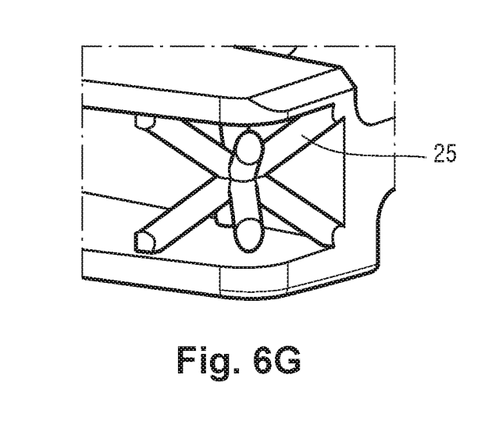
FIG. 6G is an enlargement of one of the internal patterns of the spacer.

In a fourth particular embodiment, as shown in FIGS. 6A to 6G, the spacer 10 is obtained by additive manufacturing so as to provide a hollowed-out trellis structure 24 inside the blocks 11, having a star-shaped elementary pattern 25 that can be seen in FIG. 6G. The pattern 25 is similar to that of the above embodiment. Nevertheless, in this example, the cube in which the pattern 25 is inscribed has a side that is twice the side of the above embodiment, such that the patterns 25 are juxtaposed in a single layer parallel to the XY plane. The hollowed-out structure leads to a void fraction in the bearing blocks 11 of 51%. Compared with a solid spacer, the reduction in the heat flux transmitted by conduction through the spacer is estimated at 63%.

Figure 7A:
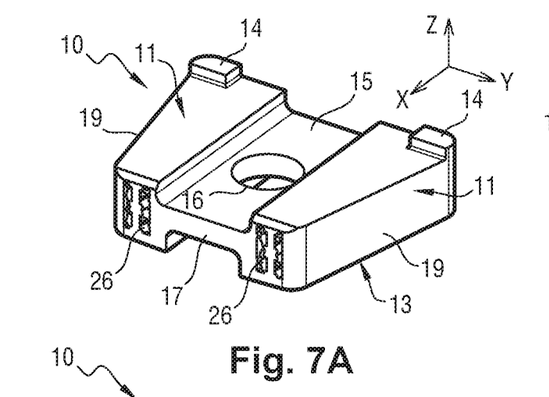
FIGS. 7A to 7F are perspective, front, and rear views followed by section views that show a spacer having hollowed-out blocks in a fifth particular embodiment of the invention.
Figure 7B:
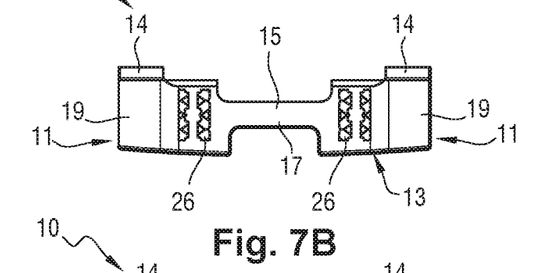
Figure 7C:
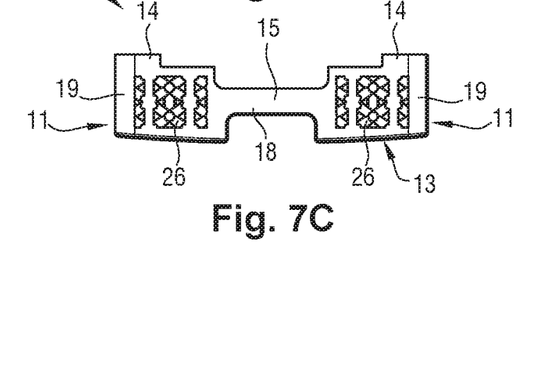
Figure 7D:
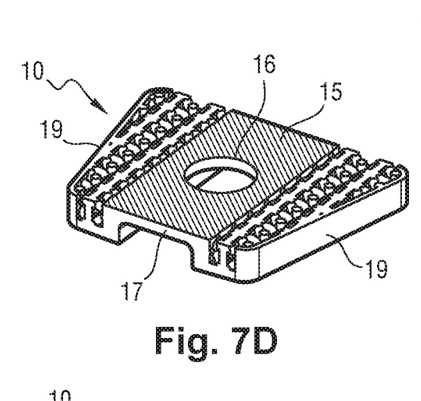
Figure 7E:
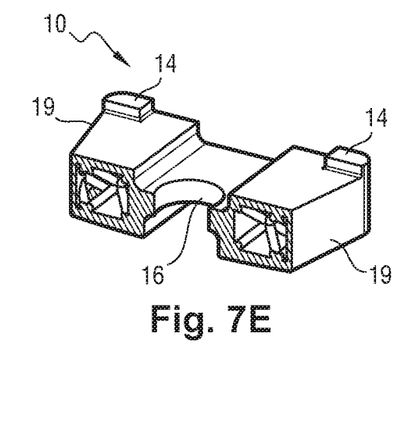
Figure 7F:
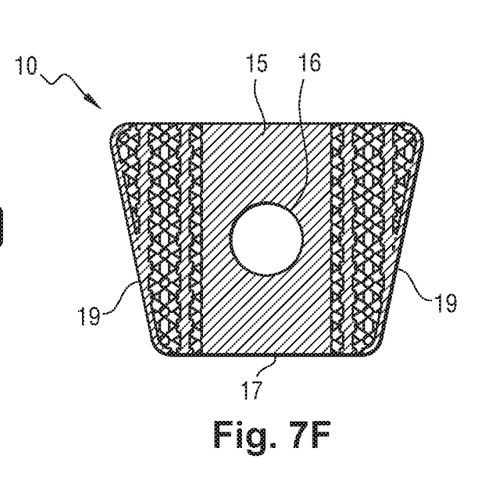
Figure 7G:
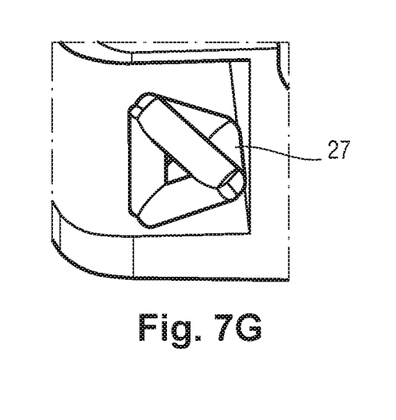
FIG. 7G is an enlargement of one of the internal patterns of the spacer.

In a fifth particular embodiment, as shown in FIGS. 7A to 7G, the spacer 10 is obtained by additive manufacturing so as to provide a hollowed-out trellis structure 26 inside the blocks 11 having a tetrahedral elementary pattern 27 that can be seen in FIG. 7G, made up of branches of constant section with one branch extending in the (0,0,1) direction and an opposite branch extending in the (1,0,0) direction. The pattern is duplicated in the directions (1,0,0), (1,√2,1) and (1,√2,-1). This hollowed-out structure gives rise to a void fraction in the bearing blocks 11 of 53%. Compared with a solid spacer, the reduction in the heat flux transmitted by conduction through the spacer is estimated at 67%.

In a sixth particular embodiment, as shown in FIGS. 8A to 8F, the spacer 10 is obtained by additive manufacturing so as to provide a tetrahedral structure 28 inside the blocks 11 having an elementary pattern made up of branches of constant section including a branch extending in the (0,1,0) direction and an opposite branch in the (1,0,0) direction. This pattern is duplicated in the (1,0,0), (1,1), and (1, 1), directions. In this embodiment, the voids as made in this way also open out to the flanks 19 of the blocks 11. This hollowed-out structure gives rise to a void fraction in the bearing blocks 11 of 37%. Compared with a solid spacer, the reduction in the heat flux transmitted by conduction through the spacer is estimated at 44%.

Figure 9A:
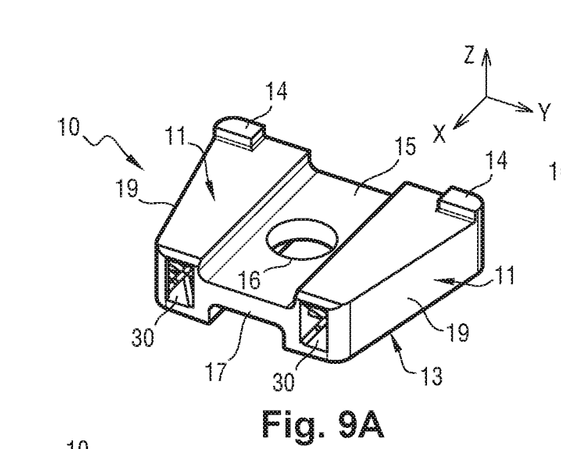
FIGS. 9A to 9F are perspective, front, and rear views followed by section views that show a spacer having hollowed-out blocks in a seventh particular embodiment of the invention.
Figure 9B:
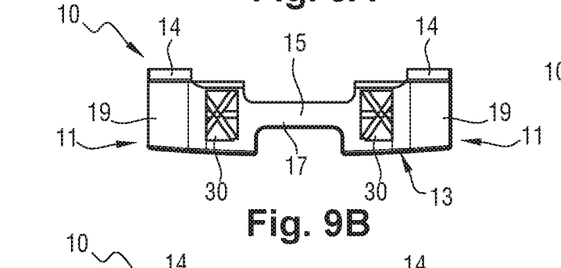
Figure 9C:
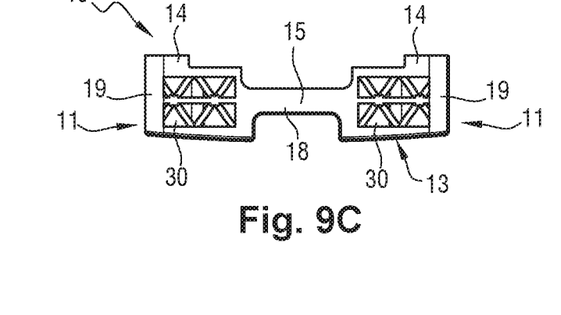
Figure 9D:
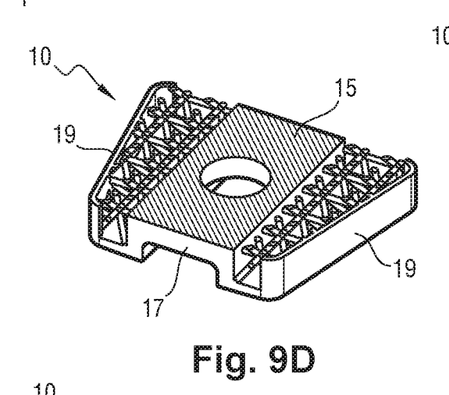
Figure 9E:
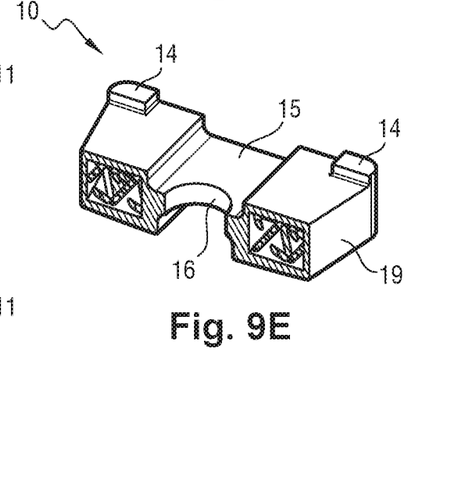
Figure 9F:
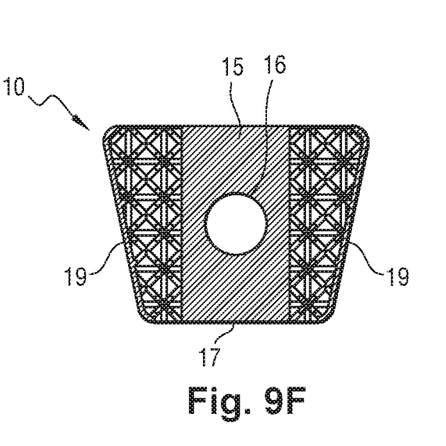
Figure 9G:
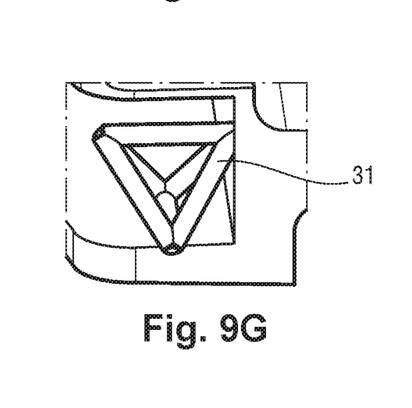
FIG. 9G is an enlargement of one of the internal patterns of the spacer.

In a seventh particular embodiment, as shown in FIGS. 9A to 9G, the spacer 10 is obtained by additive manufacturing so as to provide a hollowed-out trellis structure 30 inside the blocks 11 with a tetrahedral elementary pattern 31 that can be seen in FIG. 9G and that comprises branches of constant section including a branch extending in the (0,1,0) direction and an opposite branch extending in the (1,0,0) direction. This pattern is duplicated in the directions (1,0,0), $(1,1,\sqrt{2})$, $(1,-1,\sqrt{2})$. This hollowed-out structure gives rise to a void fraction in the bearing blocks of 37%. Compared with a solid spacer, the reduction in the heat flux transmitted by conduction through the spacer is estimated at 46%.

Figure 10A:
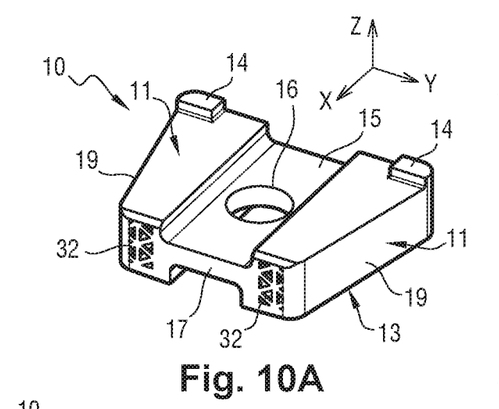
FIGS. 10A to 10F are perspective, front, and rear views followed by section views that show a spacer having hollowed-out blocks in an eighth particular embodiment of the invention.
Figure 10B:
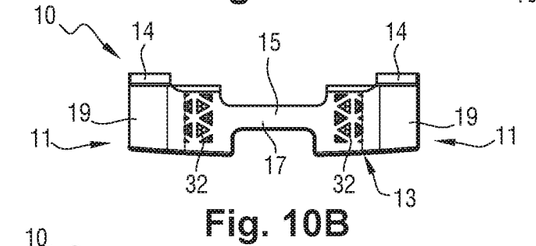
Figure 10C:
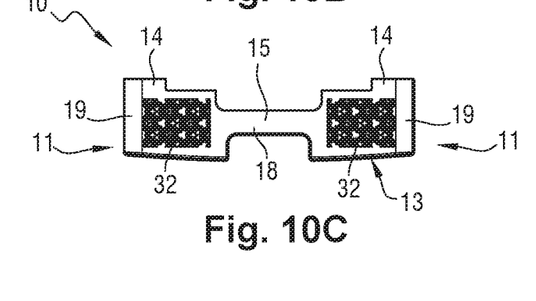
Figure 10D:
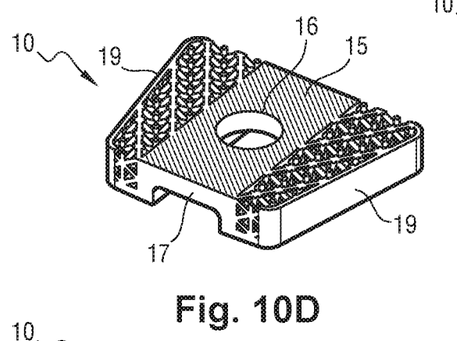
Figure 10E:
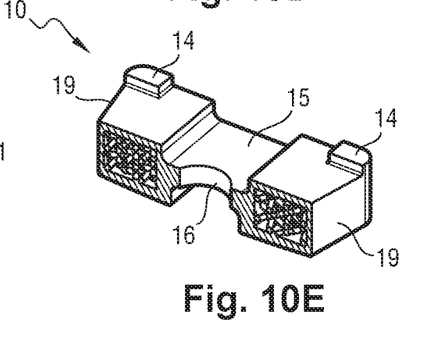
Figure 10F:
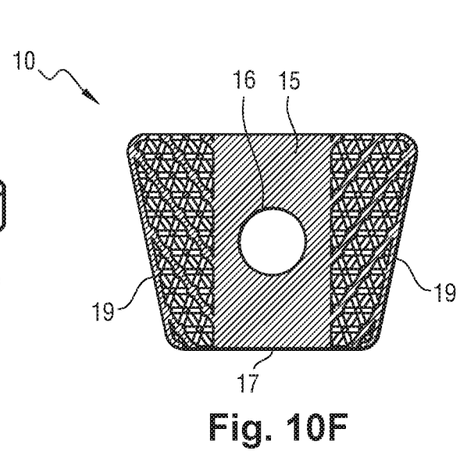
Figure 10G:
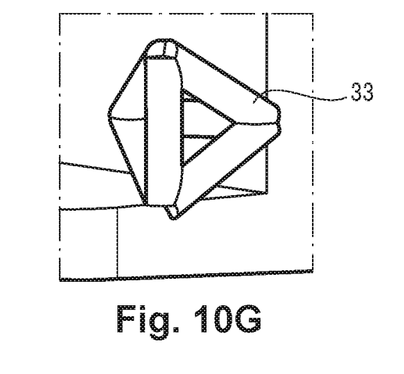
FIG. 10G is an enlargement of one of the internal patterns of the spacer.

In an eighth particular embodiment, as shown in FIGS. 10A to 10G, the spacer 10 is obtained by additive manufacturing so as to provide a hollowed-out trellis structure 32 inside the blocks 11, having a tetrahedral elementary pattern 33 that can be seen in FIG. 10G and that comprises branches of constant section including a branch extending in the (0,0,1) direction and a face extending parallel to the YZ plane. This pattern is duplicated along the directions (0,0,1), $(1,\sqrt{2},1)$, $(-2\sqrt{2},1,\sqrt{3})$. This hollowed-out structure gives rise to a void fraction in the bearing blocks of 44%. The reduction in the heat flux transmitted by conduction through the spacer is estimated at 57%.

In a ninth particular embodiment, as shown in FIGS. 11A to 11F, the spacer 10 is obtained by additive manufacturing so as to provide a hollowed-out trellis structure 34 inside the bearing blocks 11, having a tetrahedral elementary pattern that is similar to that of the above embodiment. In this embodiment, the recesses also open out to the flanks 19 of the blocks 11. This hollowed-out structure leads to a void fraction in the bearing blocks 11 of 46%. Compared with a solid spacer, the reduction in the heat flux transmitted by conduction through the spacer is estimated at 62%.

Figure 8A:
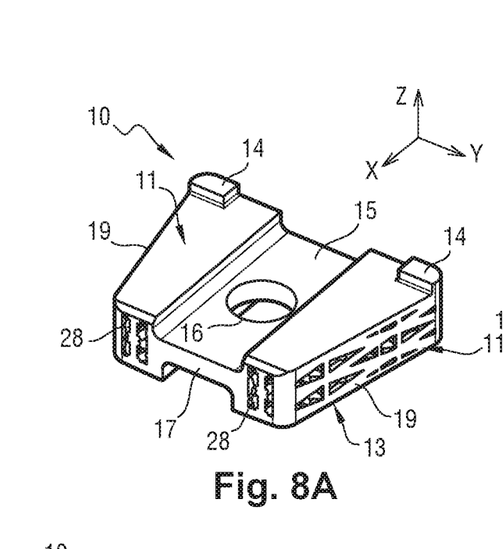
FIGS. 8A to 8F are perspective, front, and rear views followed by section views that show a spacer having hollowed-out blocks in a sixth particular embodiment of the invention.
Figure 8B:
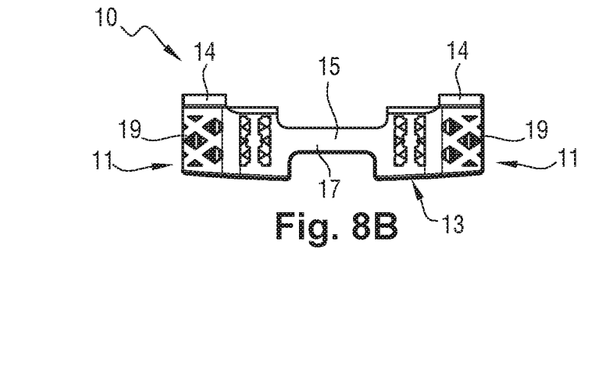
Figures 8C, 8D, 8E, 8F:
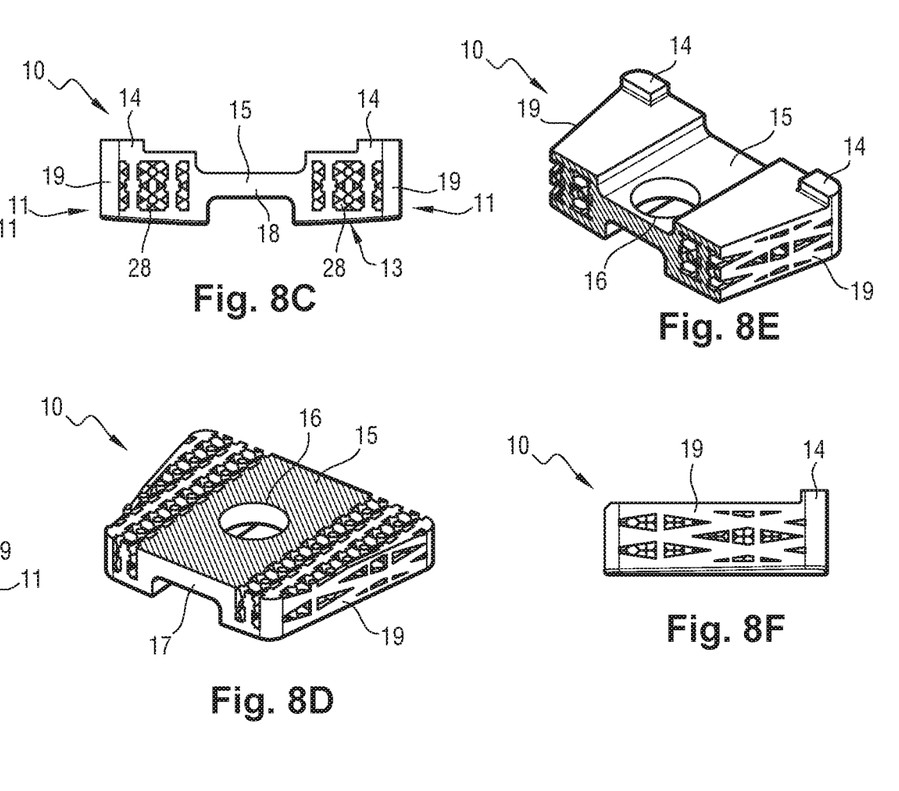
Figure 11A:
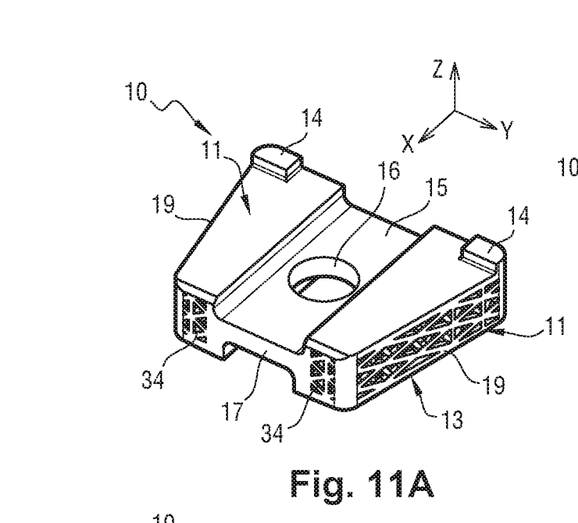
FIGS. 11A to 11F are perspective, front, and rear views followed by section views that show a spacer having hollowed-out blocks in a ninth particular embodiment of the invention.
Figure 11B:
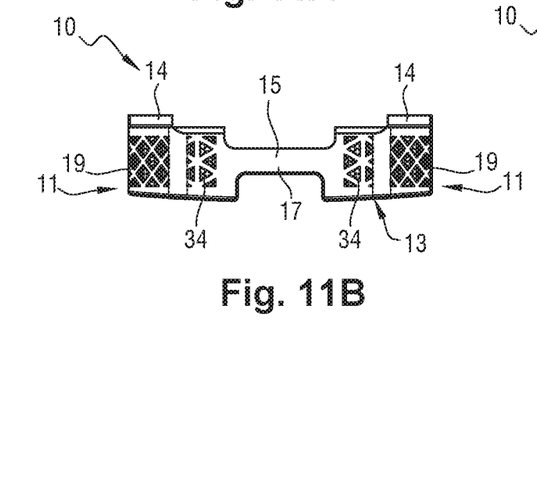
Figure 11C:
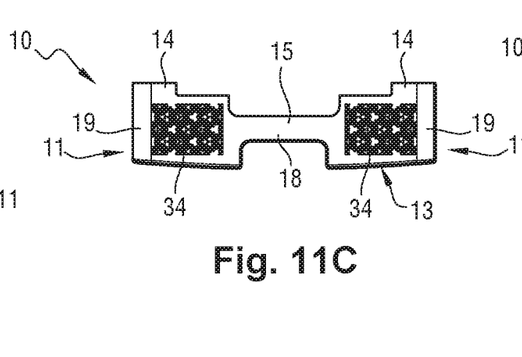
Figure 11D:
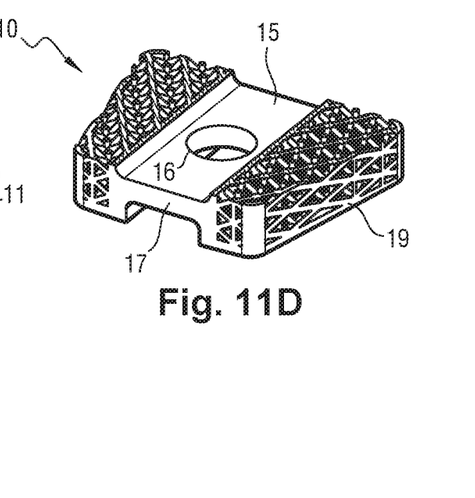
Figure 11E:
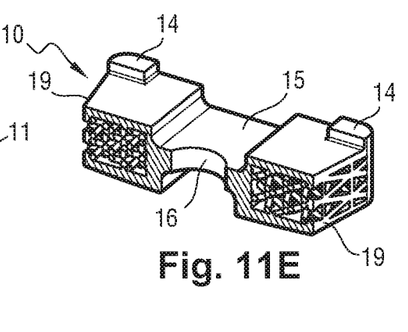
Figure 11F:
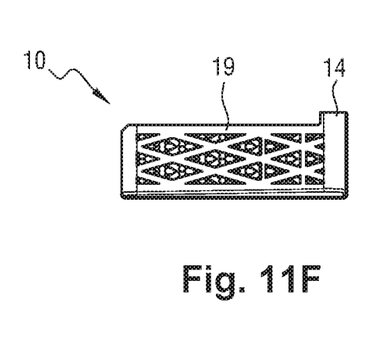

Hollowing-out the bearing blocks by at least 30% leads to a spectacular reduction in the heat flux that is transmitted by conduction through the bar spacer to the rim, while preserving the ability of the spacer to transmit braking torque. It is preferred to use distributed hollowed-out structures for defining voids that open out both to the front face and to the rear face of the spacer so as to provide a path between those two faces to enable air to flow inside the spacer, in particular under the effect of a forced flow of air imposed by a brake cooling fan. The voids may also open out to the flanks of the spacer, as shown in FIG. 8A or 11A.

The invention is not limited to the above description, but on the contrary covers any variant coming within the ambit defined by the claims. In particular, although the voids are obtained herein by tubular channels or by repeating hollowed-out branching patterns, any other configuration could be envisaged providing it gives rise to a void fraction in the bearing blocks of at least 30%.

The invention claimed is:

1. A spacer for a braked aircraft wheel, the spacer being for interposing between a rim of the wheel and a bar fitting to the rim in order to drive brake rotor disks in rotation, the spacer comprising:
   two bearing blocks connected together by a core that is pierced to pass a screw for fastening the bar to the rim,
   wherein the bearing blocks of the spacer are hollowed out so as to include voids defining a void fraction equal to at least 30% of the overall volume of the bearing blocks, said voids being distinct from pores of a material in which the bearing blocks are made and opening out at least in a front face and in a rear face of the spacer to provide an air passage between those two faces.

2. The spacer according to claim 1, wherein the voids open out in flanks of the spacer.

3. The spacer according to claim 1, wherein the voids are obtained by making tubular channels in the blocks, the channels extending from the front face to the rear face of the spacer.

4. The spacer according to claim 1, wherein the voids are obtained by means of a hollowed-out structure defined by repeating a branching pattern and that extends from the front face to the rear face of the spacer.

5. The spacer according to claim 4, wherein the pattern is a star pattern inscribed in a cube having branches radiating from the center of the cube towards the eight corners of the cube.

6. The spacer according to claim 4, wherein the elementary pattern is a tetrahedral pattern.

7. An aircraft wheel rim fitted with bars fastened to the rim with interposed spacers according to claim 1.

* * * * *